(12) United States Patent
Dodson

(10) Patent No.: US 7,273,167 B2
(45) Date of Patent: Sep. 25, 2007

(54) REVENUE BALANCING METHOD AND COMPUTER PROGRAM

(75) Inventor: Douglas A. Dodson, Gardner, KS (US)

(73) Assignee: Balance Innovations, LLC, Lenexa, KS (US)

( * ) Notice: Subject to any disclaimer, the term of this patent is extended or adjusted under 35 U.S.C. 154(b) by 482 days.

(21) Appl. No.: 11/055,815

(22) Filed: Feb. 11, 2005

(65) Prior Publication Data

US 2005/0211762 A1   Sep. 29, 2005

(51) Int. Cl.
*G07F 19/00* (2006.01)
(52) U.S. Cl. .................. 235/379; 235/375; 235/380
(58) Field of Classification Search ............... 235/379, 235/375, 380; 194/217; 705/35, 21, 16
See application file for complete search history.

(56) References Cited

U.S. PATENT DOCUMENTS

| | | | |
|---|---|---|---|
| 4,142,235 A * | 2/1979 | Tadakuma et al. | ............ 705/24 |
| 4,319,326 A | 3/1982 | Uchida | |
| 4,447,885 A | 5/1984 | Biss | |
| 4,495,627 A | 1/1985 | Nishimura | |
| 4,512,428 A | 4/1985 | Bullivant | |
| 4,522,275 A | 6/1985 | Anderson | |
| 4,532,641 A | 7/1985 | Nishimura | |
| 4,646,767 A | 3/1987 | Hikita | |
| 4,674,060 A | 6/1987 | Larkin | |
| 4,682,228 A | 7/1987 | Ando | |
| 4,752,874 A | 6/1988 | Meyers | |
| 4,839,505 A | 6/1989 | Bradt | |
| 4,868,489 A | 9/1989 | Kowalski | |
| 4,967,576 A | 11/1990 | Warfman | |
| 5,040,227 A | 8/1991 | Lyke | |
| 5,126,732 A | 6/1992 | Mardon | |
| 5,128,862 A | 7/1992 | Mueller | |
| 5,193,629 A | 3/1993 | Lare | |
| 5,227,966 A | 7/1993 | Ichiba | |
| 5,308,120 A | 5/1994 | Thompson | |
| 5,366,404 A | 11/1994 | Jones | |
| 5,396,417 A | 3/1995 | Burks | |
| 5,397,264 A | 3/1995 | Gross | |
| 5,564,546 A | 10/1996 | Molbak | |
| 5,691,524 A * | 11/1997 | Josephson | ..................... 705/40 |
| 5,756,977 A | 5/1998 | Biss | |

(Continued)

FOREIGN PATENT DOCUMENTS

FR            2586840          3/1997

(Continued)

OTHER PUBLICATIONS

Twenty-First Century Hotel Systems, Twenty-First Century Inn System Procedures Manual vol. IV: Front Office System Training (1993).

(Continued)

*Primary Examiner*—Karl D. Frech
(74) *Attorney, Agent, or Firm*—Spencer Fane Britt & Browne LLP

(57) ABSTRACT

A revenue balancing method and computer program that more quickly, accurately, and easily reconciles or balances revenue contained in a first cash drawer while at the same time building or filling a second cash drawer.

21 Claims, 11 Drawing Sheets

U.S. PATENT DOCUMENTS

| | | |
|---|---|---|
| 5,805,456 A | 9/1998 | Higham |
| 5,813,510 A | 9/1998 | Rademacher |
| 5,830,054 A | 11/1998 | Petri |
| 5,909,794 A | 6/1999 | Molbak |
| 5,913,399 A | 6/1999 | Takemoto |
| 5,943,655 A | 8/1999 | Jacobson |
| 5,944,162 A | 8/1999 | Filiberti |
| 5,947,257 A | 9/1999 | Schwartz |
| 5,954,576 A | 9/1999 | Coulter |
| 6,047,808 A | 4/2000 | Neubarth |
| 6,067,530 A | 5/2000 | Brooks |
| 6,109,774 A | 8/2000 | Holmes |
| 6,196,913 B1 | 3/2001 | Geib |
| 6,328,149 B1 | 12/2001 | Blad |
| 6,494,776 B1 | 12/2002 | Molbak |
| 6,520,308 B1 | 2/2003 | Martin |
| 6,772,941 B1 | 8/2004 | Carter |
| 2004/0181481 A1 | 9/2004 | Carter |

FOREIGN PATENT DOCUMENTS

| | | |
|---|---|---|
| GB | 2269088 A | 2/1994 |
| JP | 404023096 A | 1/1992 |
| JP | 404088496 A | 3/1992 |

OTHER PUBLICATIONS

"Managing the Cash Drawer Becomes a Weighty Issue for Wesson", c-storedecisions.com, date unknown.

AND MC-2000 Money Counting Scale, Itin Scale Company, www.itinscales.com/and_mc_money_counting_scale_htm, 1998.

* cited by examiner

Fig. 2.

| Operator:248 | St | | | | on: 1 |
|---|---|---|---|---|---|
| POS TS: 12/14/2000 7:23am (07: | | Units | Rolls | Amount Target | 0:47am |
| Pennies $ 0.00 | | 0 | 0 $ 0.00 | | |
| Nickels | $ 0.00 | 0 | | $ 0.00 | $ 0.00 |
| Dimes | $ 0.00 | 0 | | $ 0.00 | $ 284.15 |
| Quarters | $ 0.00 | 0 | | $ 0.00 | $ 0.00 |
| Dollars | $ 0.00 | 0 | | $ 0.00 | $ 638.33 |
| Fives | $ 0.00 | 0 | | $ 0.00  7 | $ 0.00 |
| 1 Tens | $ 0.00 | 0 | | $ 0.00  5 | $ 131.45 |
| 2 Twenties | $ 0.00 | 0 | | $ 0.00 | $ 0.00 |
| 3 Fifties | $ 0.00 | 0 | | $ 0.00 | $ 0.00 |
| 4 Hundreds | $ 0.00 | 0 | | $ 0.00 | |
| 5 $1 fd stp | $ 0.00 | 0 | | $ 0.00  1 | $ 0.00 |
| 6 $5 FS | $ 0.00 | 0 | | $ 0.00 | $ 159.82 |
| 7 $10 FS | $ 0.00 | 0 | | $ 0.00 | |
| 8 $5 Gift C | $ 0.00 | 0 | | $ 0.00 | $ 0.00 |
| 9 Postage | $ 0.00 | 0 | | $ 0.00 | $ 274.09 |
| 0 Golden $1 | $ 0.00 | 0 | | $ 0.00 | |

Target Amount = $ 150.00
0.00 Previous
New Till Total = $ 0.00
$-1487.84 Running   Current   $-1487.84

Current till = Checker   Last Function

Message Center (C)2000 Veri/Cash Systems Inc.

Fig. 4.

| | | St | Units | Rolls | Amount | | Target | on: 1 0:47am | |
|---|---|---|---|---|---|---|---|---|---|
| Pennies | | | 42 | 0 | $ | 0.42 | | $ | 12.17 |
| Nickels | | | 15 | 0 | $ | 0.75 | | $ | 284.15 |
| Dimes | | | 30 | 0 | $ | 3.00 | | $ | 271.98 |
| Quarters | | | 32 | 0 | $ | 8.00 | | $ | 0.00 |
| Dollars | $ | 0.00 | 0 | 0 | $ | 0.00 | 35 | $ | 638.33 |
| Fives | $ | 0.00 | 0 | | $ | 0.00 | 7 | | |
| 1 Tens | | | | | | .00 | 5 | $ | 0.00 |
| 2 Twenties | | | | | | .00 | | $ | 131.45 |
| 3 Fifties | | | | | | .00 | | | |
| 4 Hundreds | | | | | | .00 | | $ | 0.00 |
| 5 $1 fd stp | | | | | | .00 | | $ | 0.00 |
| 6 $5 FS | | | | | | .00 | | | |
| 7 $10 FS | | | | | | .00 | 1 | $ | 0.00 |
| 8 $5 Gift C | | | | | | .00 | | $ | 159.82 |
| 9 Postage | | | | | | | | | |
| 0 Golden $1 | | | 0 | | $ | 0.00 | | $ | 0.00 |
| | | | | | | | | $ | 274.09 |

Place coin rolls individually, then all ones on scale, or press <Enter> to continue.

Do not shuffle ones

Target Amount = $ 150.00
New Till Total = $ 12.17

$ 0.00 Previous
$-1475.67 Running

Current $ -1475.67

Current till = Checker    Last Function
Message Center    32 Quarters were added (C)2000 Veri/Cash Systems Inc.

| Page 1 | | |
|---|---|---|
| Actual CASH | $ | 284.17 |
| Called CASH | $ | 284.15 |
| | $ | 0.02 |

Fig. 8.

| Operator:248 | | Cashier :151 | | Store Name Here | | Location: 1 | |
|---|---|---|---|---|---|---|---|
| POS TS: 12/14/2000 | 7:23am (07:23) | | | Page 1 | 7/11/2000 | 10:02am | |
| | | | | Actual CASH | | $ | 0.00 |
| | | | | Called CASH | | $ | 284.15 |
| | | | | | | $ | 0.02 |

| | | | |
|---|---|---|---|
| Pennies | $ | 0.42 | |
| Nickels | $ | 0.75 | |
| Dimes | $ | 3.00 | |
| Quarters | $ | 8.00 | |
| Dollars | $ | 30.00 | |
| Fives | $ | 20.00 | |
| 1 Tens | $ | 10.00 | |
| 2 Twenties | $ | 300.00 | |
| 3 Fifties | $ | 50.00 | |
| 4 Hundreds | $ | 0.00 | |
| 5 $1 fd stp | $ | 0.00 | |
| 6 $5 FS | $ | 0.00 | |
| 7 $10 FS | $ | 0.00 | |
| 8 $5 Gift C | $ | 5.00 | |
| 9 Postage | $ | 0.00 | |
| 0 Golden $1 | $ | 0.00 | |

TO COMPLETE THE NEW TILL
ADD THE FOLLOWING

3 Pennies
   1 Nickel
   1 Quarter
   5 Dollars
   3 Fives
   4 Tens

| | | | | |
|---|---|---|---|---|
| | $ | 0.0 | | 3 |
| | $ | 284.17 | | 3 |
| | $ | 0.02 | | 0 |
| | $ | 0.0 | | 5 |
| | $ | 638.3 | | 5 |
| | $ | 0.0 | | 0 |
| | $ | 0.0 | | 0 |
| | $ | 131.4 | | 0 |
| | $ | 0.0 | | 0 |
| | $ | 0.0 | | 2 |
| | $ | 0.0 | | 2 |
| | $ | 0.0 | | 0 |
| | $ | 159.8 | | 9 |
| | $ | 0.0 | | 9 |
| | $ | 0.0 | | 0 |

Manual Entries    $    7.00         $   274.0
                                    $     0.0

0.02 Running | Current | $ 0.02

Current till = Checker                  Last Function

Message Center (C)2000 Ver/Cash Systems Inc.

Current Cashier List
7/11/2000 4:30pm

| Date | Time | Cashier | Called |
|---|---|---|---|
| 06/13/2000 | 12:10am (00:10) | 70 | $- 13.20 |
| 06/13/2000 | 9:57am (09:57) | 125 | $ 22.83 |
| 06/13/2000 | 10:01am (10:01) | 155 | $ 1826.75 |
| 06/13/2000 | 10:18am (10:18) | 125 | $ 327.14 |
| 06/13/2000 | 10:34am (10:34) | 125 | $ 467.68 |
| 06/13/2000 | 10:37am (10:37) | 174 | $ 2031.49 |
| 06/13/2000 | 10:54am (10:54) | 125 | $ 660.46 |
| 06/13/2000 | 11:03am (11:03) | 155 | $ 2452.75 |
| 06/13/2000 | 11:12am (11:12) | 125 | $ 814.40 |
| 06/13/2000 | 11:13am (11:13) | 113 | $ 1926.86 |
| 06/13/2000 | 11:27am (11:27) | 6104 | $- 95.02 |
| 06/13/2000 | 11:30am (11:30) | 125 | $ 1021.10 |
| 06/13/2000 | 11:33am (11:33) | 160 | $ 1733.48 |
| 06/13/2000 | 11:52am (11:52) | 125 | $ 1283.09 |
| 06/13/2000 | 11:53am (11:53) | 113 | $ 2261.69 |

*Fig. 9.*

Cashier Balance

Store Name Here  Location: 1
7/11/2000                    10:16am
POS Timestamp: 12/14/2000 07:23
Transaction Number: 171
Operator: 248

Cashier 151

|  | Count | Amount |
|---|---|---|
| Pennies | 42 | $ 0.42 |
| Nickels | 15 | $ 0.75 |
| Dimes | 30 | $ 3.00 |
| Quarters | 32 | $ 8.00 |
| Dollars | 30 | $ 30.00 |
| Fives | 4 | $ 20.00 |
| Tens | 1 | $ 10.00 |
| Twenties | 15 | $ 300.00 |
| Fifties | 1 | $ 50.00 |
| $5 Gift C | 1 | $ 5.00 |
| Postage | 1 | $ 0.00 |
| Manual Entries |  | $ 7.00 |

| | |
|---|---|
| Total Of Media | $ 427.17 |
| w/Manual Entries | $ 434.17 |
| Less Starting Till | $ 150.00 |
| Total Media Pick-up | $ 277.17 |
| w/Manual Entries | $ 284.17 |

Accum. Bal                Current Bal

CASH
| $ 0.00 | Actual | $ 284.17 |
| $ 284.15 | Called | $ 284.15 |
| $ 0.02 |  | $ 0.02 |

CHECKS
| $ 0.00 | Actual | $ 638.33 |
| $ 638.33 | Called | $ 638.33 |
| $ 0.00 | 0015 | $ 0.00 |

EBT/FOOD STAMPS
| $ 0.00 | Actual | $ 134.45 |
| $ 131.45 | Called | $ 131.45 |
| $ 0.00 | 0001 | $ 0.00 |

DEBIT
| $ 0.00 | Actual | $ 159.82 |
| $ 159.82 | Called | $ 159.82 |
| $ 0.00 | 0001 | $ 0.00 |

CREDIT CARDS
| $ 0.00 | Actual | $ 274.09 |
| $ 274.09 | Called | $ 274.09 |
| $ 0.00 | 0004 | $ 0.00 |

Current              $      0.02
Previous Count       $      0.00
Running Total        $      0.02

Total called        $ 1487.84
Weekly O/S          $-   34.74
Tills counted in weekly O/S: 3

Cashier: 151

Summary Of Actuals

| | | |
|---|---|---|
| CASH | .... | $ 284.17 |
| CHECKS | 0015 | $ 638.33 |
| EBT/FOOD STAMPS | 0001 | $ 131.45 |
| DEBIT | 0001 | $ 159.82 |
| CREDIT CARDS | 0004 | $ 274.09 |
| Total Actuals | .......... | $ 1487.86 |

*Fig. 10.*

Store Name Here    Location: 1    10:01am
7/11/2000
Operator: 248
Cashier: 151

CHECKS LIST

| Item | Sequence# | Amount |
|---|---|---|
| 1 | 5995 | $ 100.00 |
| 2 | 5996 | 4.43 |
| 3 | 5997 | 38.00 |
| 4 | 5998 | 52.48 |
| 5 | 5999 | 9.13 |
| 6 | 6000 | 9.62 |
| 7 | 6001 | 91.20 |
| 8 | 6002 | 10.00 |
| 9 | 6003 | 20.00 |
| 10 | 6004 | 30.00 |
| 11 | 6005 | 40.00 |
| 12 | 6006 | 50.00 |
| 13 | 6007 | 6.48 |
| 14 | 6008 | 85.35 |
| 15 | 6009 | 91.64 |
| TOTAL | | $ 638.33 |

*Fig. 12.*

DEMO    12:48pm
3/14/2000
Operator: 1
Cashier: 108

CREDIT CARDS LIST

| Item | Amount |
|---|---|
| 1 | $ 7.85 |
| 2 | 15.43 |
| 3 | 152.76 |
| 4 | 98.05 |
| TOTAL | $ 274.09 |

*Fig. 13.*

Store Name Here    Location: 1    10:16am
7/11/2000
Operator: 248

New Till

| | Count | Rolls | Amount |
|---|---|---|---|
| Pennies | 45 | 1 | $ 0.95 |
| Nickels | 16 | 1 | 2.80 |
| Dimes | 30 | 1 | 8.00 |
| Quarters | 33 | 1 | 18.25 |
| Dollars | 35 | | 35.00 |
| Fives | 7 | | 35.00 |
| Tens | 5 | | 50.00 |
| Postage | 1 | | 0.00 |
| CASH TOTAL | | | $ 150.00 |
| TILL TOTAL | | | $ 150.00 |

*Fig. 11.*

```
CHECKS    SUB   BATCH   1
Sign-On : 100
Cashier : 70
7/11/2000                      4:41pm Item        Sequence #         Amount
    1            3683          $    62.35
    2            3684          $    98.26
    3            3685          $    64.58
    4            3686          $    25.00
    5            3687          $    19.64
 TOTAL                         $   269.83

CHECKS    SUB   BATCH   2
Sign-On : 100
Cashier : 125
7/11/2000                      4:43pm Item        Sequence #         Amount
    1            3688          $    20.63
    2            3689          $    20.12
    3            3690          $   113.25
    4            3691          $   105.80
 TOTAL                         $   259.80

CHECKS    SUB   BATCH   3
Sign-On : 100
Cashier : 174
7/11/2000                      4:44pm Item        Sequence #         Amount
    1            3692          $    21.37
    2            3693          $    92.43
    3            3694          $   138.56
    4            3695          $    48.26
    5            3696          $    40.00
    6            3697          $    31.63
    7            3698          $    85.75
 TOTAL                         $   458.00

CHECKS    BATCH   TOTAL
 Item   Csh#    End Seq #       Sub-Total
   5     70       3687        $   269.83
   4    125       3691        $   259.80
   7    174       3698        $   458.00

16                          $   987.63

SIGNATURE
Veri/Cash Lab      LOCATION : 1
Sign-on : 100
7/11/2000                      4:45pm
```

| Operator:248 | Cashier :151 | Store Name Here | | Location: 1 | |
|---|---|---|---|---|---|
| POS TS: 12/14/2000 | 7:23am (07:23) | | Page 1 | 7/11/2000 10:08am | |
| Pennies | $ 0.42 | $ | 0.00 | Actual CASH | $ 284.17 |
| Nickels | $ 0.75 | $ | 284.15 | Called CASH | $ 284.15 |
| Dimes | $ 3.00 | $ | 0.02 | | $ 0.02 |
| Quarters | $ 8.00 | | | NOW ADD: | 3 |
| Dollars | $ 30.00 | $ | 638.3 | 1 Penny roll | 3 |
| Fives | $ 20.00 | $ | 0.0 | 1 Nickel roll | 5 |
| 1 Tens | $ 10.00 | $ | 0.0 | 1 Dime roll | 5 |
| 2 Twenties | $ 300.00 | $ | 131.4 | 1 Quarter roll | 0 |
| 3 Fifties | $ 50.00 | $ | 0.0 | | 0 |
| 4 Hundreds | $ 0.00 | $ | 0.0 | | 0 |
| 5 $1 fd stp | $ 0.00 | $ | 0.0 | | |
| 6 $5 FS | $ 0.00 | $ | 0.00 | Actual DEBIT | $ 159.82 |
| 7 $10 FS | $ 0.00 | $ | 159.82 | Called DEBIT | $ 159.82 |
| 8 $5 Gift C | $ 5.00 | $ | 0.00 | | $ 0.00 |
| 9 Postage | $ 0.00 | $ | 0.00 | Actual CREDIT CARDS | $ 274.09 |
| 0 Golden $1 | $ 0.00 | $ | 274.09 | Called CREDIT CARDS | $ 274.09 |
| | | $ | 0.00 | More... | $ 0.00 |
| Manual Entries | $ 7.00 | $ | 0.00 Previous<br>0.02 Running | Current | $ 0.02 |
| Current till = Checker | | | | Last Function | |
| Message Center | | | | | |

(C)2000 Veri/Cash Systems Inc.

REVENUE BALANCING METHOD AND COMPUTER PROGRAM

MICROFICHE SOURCE CODE APPENDIX

A Microfiche Appendix containing a source code of the computer program of the present invention is appended hereto as 8 sheets of microfiche containing a total of 499 frames and is hereby incorporated by reference into this application as if fully set forth herein.

BACKGROUND OF THE INVENTION

1. Field of the Invention

The present invention relates to the reconciliation and balancing of cash register cash drawers or tills. More particularly, the invention relates to a revenue balancing method and computer program that more quickly, accurately, and easily reconciles or balances revenue contained in a first cash drawer while at the same time building or filling a second cash drawer.

2. Description of the Prior Art

Grocery stores and other retail and wholesale establishments that use cash registers to ring up sales must regularly reconcile or balance cashiers' cash drawers at the end of shifts to ensure that the money in the cash drawers matches sales figures for the cash registers. Cash drawers must also be "rebuilt" or constructed in preparation for another cashier coming on shift.

Most stores typically balance and construct cash drawers with back office accounting personnel who manually remove and count the money from cash drawers after a cashier's shift has ended and manually count and add money to new cash drawers. Those skilled in the art will appreciate that such manual methods of balancing and constructing cash drawers are very time consuming and often lead to miscounting errors. For large stores that regularly balance and construct many cash drawers every day, the costs associated with such cash drawer balancing and construction can be substantial.

Systems and methods that automate some aspects of cash drawer balancing and construction have been developed. However, these systems and methods still require accounting personnel to manually perform many of the steps required to balance and build cash drawers and therefore are still time consuming and prone to miscounting errors.

Another problem with prior art systems and methods of cash drawer balancing and reconciliation is the need to repeatedly perform pick-ups (the removal of excess cash from cash drawers for security reasons), loans (the addition of extra cash into cash drawers for change-making purposes), and/or the purchase of additional change by cashiers. Pick-ups, loans, and change purchasing typically involve several employees and therefore use a considerable amount of labor, especially for large stores.

SUMMARY OF THE INVENTION

The present invention solves the above-described problems and provides a distinct advance in the art of cash drawer reconciliation and construction systems and methods. More particularly, the present invention provides a revenue balancing method and computer program that more quickly, accurately, and easily reconciles or balances revenue contained in cash drawers at the end of cashiers' shifts or breaks while at the same time building or constructing new cash drawers for new shifts. The present invention also effectively eliminates the need for pick-ups, loans, and purchasing of change.

In one preferred embodiment, the present invention is implemented with a computer program stored on a computer-readable media for directing operation of a computer. The computer first prompts an operator to remove revenue from a first cash drawer that was used by a cashier after a break or shift and to place the revenue in or on a second, initially empty cash drawer that is placed on a weigh scale. The computer receives weight measurements from the weigh scale as revenue is placed in or on the second cash drawer, and based on these weight indications, counts the revenue as it is added to the second cash drawer.

The computer continues to prompt the operator to add revenue to the second cash drawer until target amounts of each denomination have been reached, if available from the cash drawer being counted. After the target amounts have been added, the computer prompts the operator to remove any remaining revenue from the first cash drawer and to place it on top of the second cash drawer or directly on the scale. The computer receives from the scale an indication of the weight of the remaining revenue as it is placed on the weigh scale and counts this remaining revenue based on the weight indication.

Finally, the computer calculates a total amount of revenue that was removed from the first cash drawer based on the weighing of the revenue and reconciles or balances the total amount of revenue that was removed with sales information received from the cash register or a point-of-sale system interfaced to the revenue balancing system. The computer program may then prompt the operator to add additional revenue to the second cash drawer from another source if the first cash drawer did not contain enough of the required denominations to meet the target amounts.

The present invention is faster, more accurate, and easier to use than prior art methods and systems because revenue is weighed and automatically counted by a computer rather than manually counted by accounting personnel. The present invention also permits an operator to simultaneously reconcile or balance a first cash drawer after a cashier's shift or break and construct or build a second cash drawer to be used by a cashier needing a fresh till. Applicant has discovered that the present invention reduces the labor time for balancing or reconciling a cash drawer from an average of 15-45 minutes to only three minutes or less. Moreover, unlike prior art revenue balancing methods and systems, the present invention simultaneously constructs a new cash drawer during this approximate three-minute time.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 2 is a screen shot of a "new till" screen of the computer program of the present invention.

FIG. 4 is a screen shot of the "new till" screen as revenue is added to the second cash drawer.

FIG. 8 is a screen shot of a screen showing the types and quantities of revenue that need to be added to a second cash drawer to meet certain target amounts for the cash drawer.

FIG. 9 illustrates a Current Cashier List report.

FIG. 10 illustrates a Cashier Balance report.

FIG. 11 illustrates a New Till Configuration report.

FIG. 12 illustrates a Checks List report.

FIG. 13 illustrates a Credit/Debit Cards List report.

FIG. 14 illustrates a Checks Batch List report.

FIG. 15 is a screen shot showing the prompting of rolls of coins.

Figure 1:
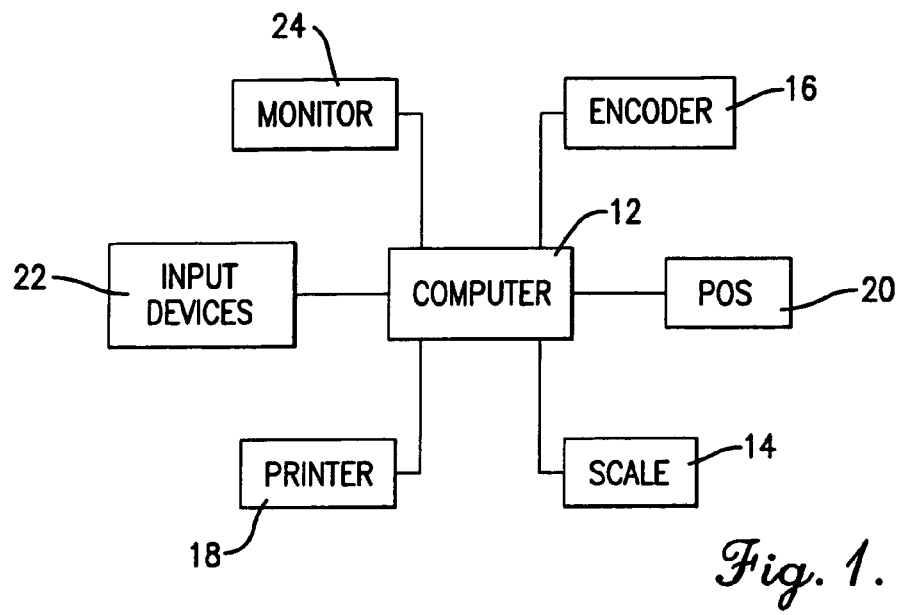
FIG. 1 is a schematic diagram of certain computer equipment that may be used to implement the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention can be used to reconcile, balance, or count any types of revenue contained in cash drawers or tills. As used herein, the term "revenue" may include paper cash, coins, checks, credit card receipts, coupons, travelers' checks, food stamps, and any other financial instruments. The term "revenue" may also include user-configurable financial instruments such as in-store coupons. The different types of revenue may also be referred to as "fields" of revenue herein. For example, the computer program of the present invention may include fields for cash, checks, and credit cards. An operator or administrator can define up to 18 fields of revenue and can change the nature of all fields. Each type of revenue may include different denominations. For example, paper cash revenue may include denominations of $1 bills, $5 bills, $10 bills, $20 bills, $50 bills, and $100 bills. Similarly, coins may include denominations for pennies, nickels, dimes, quarters, and dollar coins. As with the fields of revenue, the denominations may be configured by an operator. The term "cash drawer" may include cash drawers or tills used in cash registers or any other type of drawer, holder, or enclosure that is used to hold, receive, and dispense revenue in connection with sales. As used herein, "cash drawer" and "till" are one and the same.

The present invention can be implemented in hardware, software, firmware, or a combination thereof. In a preferred embodiment, however, the invention is implemented with a computer program that operates the computer equipment broadly referred to by the numeral 10 in FIG. 1. The preferred computer equipment 10 includes a computer 12, a weigh scale 14, an encoder 16, a printer 18, and a point-of-sale (POS) system 20. The components of the computer equipment 10 are preferably housed in or on a metal cabinet and stand for ease of use and protection. The computer program and computer equipment 10 illustrated and described herein are merely examples of a program and equipment that may be used to implement the present invention and may be replaced with other software and computer equipment without departing from the scope of the present invention.

The computer 12 controls operation of and/or receives inputs from the weigh scale 14, the encoder 16, the printer 18, and the POS system 20 in accordance with instructions from the computer program. The computer 12 may be any computing device such as an IBM compatible personal computer including those manufactured and sold by Dell, Compaq, Gateway, or any other computer manufacturer. The computer 12 preferably includes or is coupled with conventional input devices 22 such as a keyboard and a computer mouse. The computer 12 is also preferably coupled with a computer monitor 24 or screen. The preferred monitor is a flat-screen monitor such as the model number BP350 monitor sold by Sceptre.

The weigh scale 14 is coupled with the computer 12 through a serial, parallel, or Universal Serial Bus (USB) port on the computer 12 and is used for weighing revenue and providing corresponding weight signals to the computer 12 as described in more detail below. The weigh scale 14 may be any conventional scale that is capable of accurately weighing and distinguishing between different denominations of revenue. The preferred scale is a 3000 gram scale manufactured by Ishiba Company Limited. It is anticipated that a 6200 gram scale would be preferable to accommodate the new dollar coins introduced in the year 2000 and the new $5 and $10 coins expected to be issued thereafter.

The weigh scale 14 preferably weighs both an empty cash drawer placed thereon and revenue placed in the empty cash drawer. The weight of empty cash drawers can be predetermined and stored in memory accessible by the computer 12 so that the computer program can subtract this weight from all weight measurements to determine the weight of the revenue placed in or on cash drawers placed on the weigh scale 14. All possible revenue that is to be counted with the present invention is also weighed if the items are consistent in weight and value. The weight measurements for the different types of revenue are stored in the computer 12 or memory accessible by the computer 12 so that the computer program can distinguish between the different types of revenue that are weighed by the weigh scale 14 to count the revenue. Revenue may also be placed directly on the weigh scale 14.

The printer 18 is coupled with the computer 12 through a serial, parallel, or USB port on the computer 12 and is used to print various reports or tickets as described below. The printer 18 may be any conventional printing device but is preferably a high-speed thermal printer such as the model number TM-T88IIP printer manufactured by Epson.

The encoder 16 is coupled with the computer 12 through a serial, parallel, or USB port on the computer 12 and is used to encode checks received in cash drawers as described in more detail below. The preferred encoder is a model number M-406 encoder manufactured by Maverick.

The POS system 20 is coupled with the computer 12 via a POS system interface. The POS system 20 communicates with the cash registers in a store and provides inputs to the computer 12 as described in more detail below. The computer 12 may interface with any POS system such as the IBM Supermarket 1, Supermarket 5.2, Ace System, or other POS systems manufacturers. Although it is preferred to couple the computer 12 with a POS system 20 as illustrated, the computer program functions without a direct connection to a POS system 20.

The computer program of the present invention is stored in or on computer-readable medium residing on or accessible by the computer 12 for instructing the computer 12 and other components of the computer equipment 10 to operate as described herein. The computer program may run in DOS, Windows, or any other operating system environment and preferably comprises an ordered listing of executable instructions for implementing logical functions in the computer 12 and any computing devices coupled with the computer 12. Source code for the computer program is reproduced in the attached microfiche appendix.

The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Once the computer program is installed, it may be started with a command, such as "cash.exe". The computer program then displays an icon on the desktop of the operating system software of the computer 12. The program then goes through an initialization phase where it checks software protection keys, loads required data from the computer hard drive into memory, sets the monitor 24 display for the correct display mode, loads needed drivers for display types and fonts, and initializes the components coupled with the computer 12.

The computer program initially displays a main menu or screen on the monitor 24. The main menu may provide links to various cash balancing functions such as Loans, Pickups, Prepare Cash Deposits, and Safe Countdown. The main menu may also provide links to sub-menus such as Setup Options, Prepare Reports, Prepare Batches, and Prepare Deposits. From the Setup Options menu, an operator may configure various options and flags to their specific needs and desires as described in more detail below.

In accordance with one important aspect of the present invention, the computer program includes a routine or portion that permits an operator to simultaneously balance or reconcile a first cash drawer that has been used by a cashier and construct an initially empty second cash drawer that will be used by a cashier for a future shift. To begin a cash drawer balancing and construction process, an operator first enters an operator identification (ID) number and a cashier ID number into an ID window on the main screen. Operator ID numbers are typically assigned to accounting personnel who are authorized to balance, reconcile, and construct cash drawers. Cashier ID numbers are typically assigned to all authorized cashiers in a store. The terms "operator" and "cashier" are user-definable aspects of the program.

The computer program next prompts the operator to select the type of cash drawer that is to be constructed in the initially empty cash drawer. Different types of cash drawers may be constructed for different purposes. For example, in a grocery store, a regular cash drawer may be constructed for cashiers in regular checkout aisles and an express cash drawer may be constructed for cashiers in express checkout aisles. Because the sales made by regular cashiers and express cashiers are typically different, these two different types of cash drawers may require a different number and/or mix of denominations of revenue. For example, an express cashier may typically receive more cash payments and therefore need more coins and small bills for making change. The computer program therefore permits an operator or administrator to store different target amounts of denominations for each type of cash drawer. Target amounts may also be based on cashier numbers or even the time or date of a specific shift.

The computer program then must receive the "called for" amounts for each different type or field of revenue (i.e., cash, checks, and credit cards) in the cash drawer that is to be balanced. The "called for" amounts indicate the amount of each field of revenue that should be in the cash drawer based on sales information from the cash register. In one embodiment, the computer program prompts the operator to enter the "called for" amounts. In preferred forms, however, the "called for" amounts for each field are received automatically from the store's POS system 20.

The computer program also stores and accumulates over/short amounts for each cashier. Used in conjunction with the POS system 20, this accumulated total is used to compute current "called for" amounts for each field of revenue for each cashier. Thus, if an operator balances more than one cash drawer for any cashier, the "called for" amounts will only be reflective of what is expected to be in that particular cash drawer.

When the type of cash drawer that is to be constructed is selected and the "called for" amounts for the cash drawer that is to be balanced have been entered or received from the POS system 20, the computer program is ready to begin balancing the first cash drawer and constructing the second cash drawer. An operator may begin such a procedure by placing an initially empty cash drawer on the weigh scale 14. The computer program receives a weight indication from the weigh scale 14, senses that an empty cash drawer has been placed on the weigh scale 14, and displays a "new till" screen depicted in FIG. 2. The "new till" screen displays all possible denominations of cash in the first cash drawer and initially lists their value as "0". The first denomination of cash, in this case pennies, is highlighted by the computer program.

Figure 3:
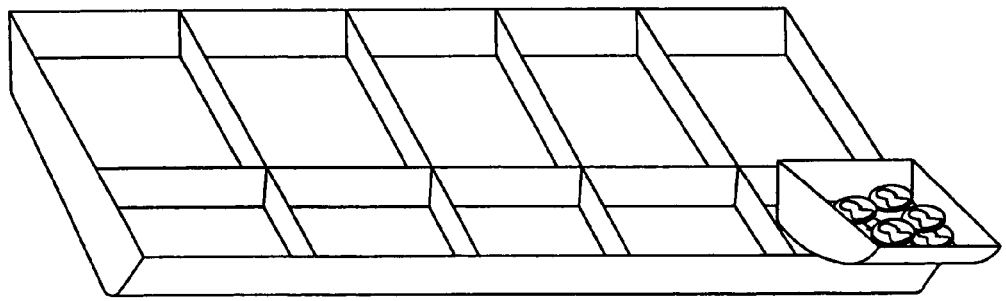
FIG. 3 is a schematic diagram depicting a second, initially empty cash drawer as it is constructed.

The highlighting of the pennies row in the "new till" screen prompts the operator to remove the pennies till cup from the cash drawer that is to be balanced (first cash drawer) and to place it in the initially empty cash drawer that is to be constructed (second cash drawer) as depicted in FIG. 3. The computer program receives a weight measurement from the weigh scale 14, and based on this weight measurement, counts the number of pennies in the till cup and displays this count in an amount column of the new till screen. This process is continued for the nickels, dimes, and quarters till cups, resulting in a "new till" screen such as the one illustrated in FIG. 4 showing amounts for these coins.

The computer program performs validation of weight measurements and only accepts valid amounts. For instance, if a dime is mixed in with the quarters, the discrepancy will be caught by the computer program. The operator will be prompted to remove the till cup and the coins, then replace the empty till cup and shuffle the remaining coins into the cup, visually inspecting that only quarters are being replaced. Audio signals also notify the operator whether weights are accepted or rejected, thus improving the speed of the operation.

Figure 5:
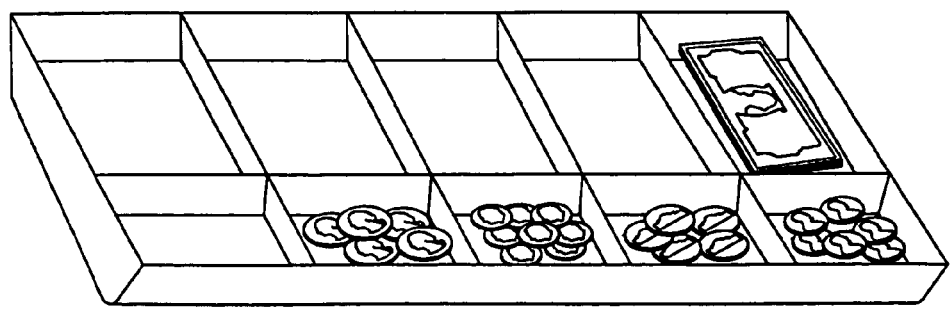
FIG. 5 is a schematic diagram depicting a second, initially empty cash drawer as it is constructed.

The computer program next highlights the dollars row in the "new till" screen and lists in a target column the target amount of dollars that should be added to the second cash drawer. The target amount is retrieved from settings for the type of cash drawer that is to be constructed. In the example illustrated in FIG. 4, the target amount is 35 $1 bills. The highlighting of the dollar row prompts the operator to remove $1 bills from the first cash drawer and to place them in the proper slot of the second cash drawer as depicted in FIG. 5. As the dollars are placed in the second cash drawer, the computer program receives a weight measurement from the weigh scale 14, counts the $1 bills based on this weight measurement, and displays the count in the amount row of the "new till" screen. The operator should continue to add $1 bills to the second cash drawer until the target amount of $1 bills (e.g., 35) has been reached. If the first cash drawer does not contain enough $1 bills to reach the target amount, the operator should place all of the $1 bills from the first cash drawer into the second cash drawer and simply press the Enter key to continue. The computer program "remembers" how many $1 bills it still needs to meet the target amount so that these $1 bills can be added later as described below.

Figures 6, 7:
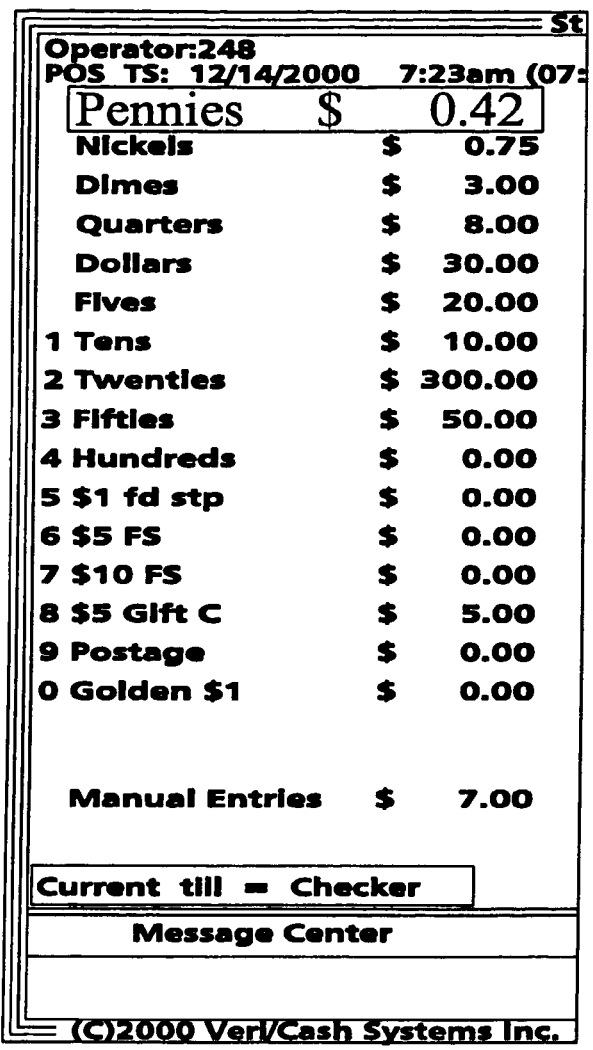
FIG. 6 is a screen shot of a "denominations" screen of the computer program.
FIG. 7 is a screen shot of a screen of the computer program showing the actual cash in a first cash drawer as well as the "called for" cash for the cash drawer, and the difference between the two.

The computer program continues the above process for $5 bills, $10 bills, $20 bills, $50 bills, $100 bills, and any other field configured with a target amount, such as postage stamps, lottery tickets, or any other revenue. After the last target field has been removed from the first cash drawer and placed in the second cash drawer, the computer program removes the "new till" screen and displays a "denominations" screen as depicted in FIG. 6. At this point, the computer program is ready to count any remaining revenue left in the first cash drawer that was not needed to meet the target amounts of revenue added to the second cash drawer. For example, the first cash drawer may have contained more than 35 $1 bills even though the target amount for $1 bills for the second cash drawer was 35. Although these additional $1 bills were not needed to reach the target amount of $1 bills for the second cash drawer, they still must be counted as a part of the balance of the first cash drawer. The computer program therefore instructs the operator to remove any remaining revenue from the first cash drawer and to place it on top of the second cash drawer so this remaining revenue may be counted. The operator may do so by highlighting any of the rows in the "denominations" screen and then removing revenue of this denomination from the first cash drawer and placing the revenue on top of the second cash drawer. The revenue should be placed on top of the cash drawer rather than in the cash drawer so that it may be easily removed as discussed in more detail below. The computer program receives weight measurements from the weigh scale 14 and, based on these weight measurements, counts the amount of the revenue that is added. Once all cash revenue has been removed from the first cash drawer in this manner, the computer program displays the amount of cash that has been counted, the "called for" amount for the cash from the POS system 20, and the difference as depicted in FIG. 7. Ideally, the difference should be relatively close to zero.

Once all of the cash revenue has been transferred from the first cash drawer to the second cash drawer and counted, the operator may continue balancing the first cash drawer by counting the remaining fields of revenue such as checks, credit card receipts, etc. from the first cash drawer. The operator may enable a flag to automatically move the cursor to the non-cash fields if the cash field balances within a certain user-definable amount. Balancing of non-cash fields of revenue typically starts with checks. In one embodiment, the operator first places the checks in the encoder 16 and keys the amounts for each of the checks into the computer 12. The encoder 16 then encodes the checks for the entered amounts and adds these amounts to a field indicating the total amount of checks. This field is balanced when the displayed amount equals the "called for" amount for checks. When this field is balanced, the computer program automatically goes to the next field of revenue that is not balanced (e.g., credit card receipts). The computer program may also prompt the encoder 16 to endorse the checks for easy deposit.

In preferred forms, however, a list of checks and the amounts of the checks that should be in the first cash drawer are received directly from the POS system 20 and displayed on the screen 24 in a checks list. The computer program displays the amount of the first check that should be in the first cash drawer on the monitor 24 in a large box for easy viewing. The operator should then read the first check received in the drawer, and if its amount matches the amount displayed, the operator need only press the Enter key to encode this check for the indicated amount. If the computer monitor 24 displays a different amount, the operator should enter the correct amount for the check via one of the input devices. The operator may either navigate the checks list using the arrow keys or enter the check amount directly. The computer program then searches the list of checks received from the POS system 20 and, if it finds a check for that amount, encodes the check.

If this amount is not found in the "called for" list of checks, a message is displayed to the operator to verify the written amount. On-screen instructions assist the operator throughout this process. If the amount was entered incorrectly by the operator, the operator presses the Escape key to return to the checks list. If the amount matches the amount written on the front of the check, the operator presses the Enter key. The operator is then prompted to remove the check from the encoder 16 and enter the amount tendered on the back of the check. If this amount is found in the checks list, the amount is replaced by the corrected amount. If the amount is not found in the list, the corrected amount is appended to the list. The operator is then prompted to drop the check into the manual feed zone of the encoder 16, which encodes the check for the correct amount.

If the operator discovers that a check was encoded for the incorrect amount while going through the checks list process, the operator may undo the last document encoded by pressing the "−" (minus) key on the keypad and then following the on-screen instructions as described above for verifying the check amount.

If it is necessary to balance another check after exiting the checks list screen, the operator may follow one of two options. First, the operator may simply type the amount of the check while the checks field is highlighted. Second, and more preferably, the operator may press the Insert key while the checks field is highlighted. The operator is prompted to enter the tendered amount of the check, then the correct amount. The operator then drops the check into the manual feed zone to be encoded.

The computer program then displays the difference of the accumulated amounts in an area devoted to checks as a memo to the operator. This display reminds the operator of the mistendered check amounts because these amounts may affect an out-of-balance condition. The computer program also displays a pop-up window listing all checks that have been mistendered. The display asks for the mistendered amount first, then the correct amount. After the correct amount is entered for a check, the computer program displays a new "difference total" which is the sum of all mistendered checks minus the sum of their mistendered amounts. Until the current correct amount is confirmed by pressing the Enter key, the operator has the opportunity to change both the correct amount and the mistendered amount.

If the encoded amount of a mistendered check is later edited as described above, the computer program will display a reminder that the check was entered as a mistendered item and will display the mistendered amount and request confirmation or reentry of that amount. Once the two amounts are confirmed, the computer program encodes the correct amount on the check as a manual feed check and lists the correct amount in the checks area of the computer screen 24.

To balance credit card receipts, the operator places the receipts on top of the weigh scale 14. The computer program receives a weight measurement from the weigh scale 14 and, based on this weight measurement, determines the number of credit card receipts. If this number matches the number of credit card receipts that were received by the cash drawer as determined from the POS system 20, the computer program proceeds to the next non-cash field of revenue. However, if the weight of the credit card receipts is incorrect, the computer program displays a list of all expected credit card receipts so that the operator may process each slip separately to determine which credit card receipts are missing. This process is similar to that of checks as described above. A credit card list is displayed and the first item is viewed in a large box on the screen 24. If the amount on the credit card slip matches the amount on the screen 24, the user simply presses the Enter key. Any missing items are revealed as individual transactions thus assisting the operator in tracking down discrepancies.

Figure 16:
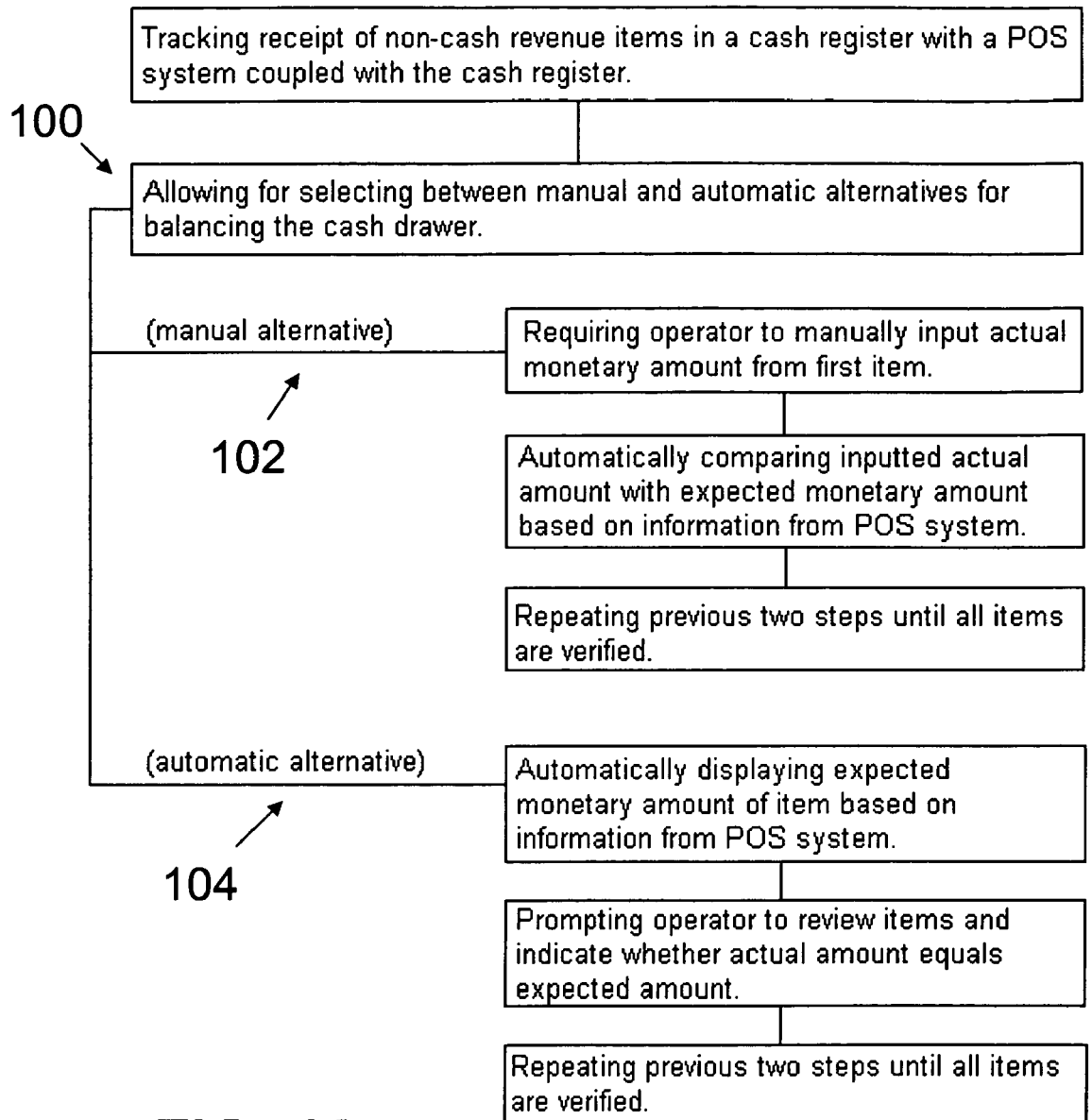
FIG. 16 is a flowchart of steps involved in practicing a portion of a preferred embodiment of the method of the present invention.

Thus, the operator may be required to manually key the amounts for each of the checks and credit card receipts, or, more preferably, the amounts are received directly from the POS system 20 and displayed on the screen 24 in a checks list so that the operator need only press the Enter key to encode the check if the displayed amount matches that of the actual check. It is possible, however, that the operator may press the Enter key to encode the check without verifying that the displayed and actual amounts match. If, in fact, the amounts do not match and therefore the check is wrongly encoded, substantial bank charges can result. Referring to FIG. 16, it is therefore preferred to provide a flag 100 which allows an administrator or other authorized person to select between requiring the operator to manually key the amounts and automatically displaying the amounts. It will be appreciated that the manual alternative 102 is slower but avoids bank charges for mis-encoded checks, while the automatic alternative 104 is faster and more convenient but could be abused to result in substantial bank charges. The flag allows the administrator to choose the alternative he or she thinks is best under the particular circumstances. In one contemplated implementation of this feature, the amount is either automatically displayed or not. In another contemplated implementation, however, the expected amount is displayed in both alternatives, but in the manual alternative the operator must nevertheless enter the actual amount of the check, even if the expected and actual amounts match, while in the automatic alternative the operator need only press Enter.

When all fields of revenue have been removed from the first cash drawer, the operator should enter "**" or any other code or sequence to indicate that the first cash drawer is now empty and the balance is acceptable. If the balance is not acceptable, the operator has the opportunity to investigate and make corrections prior to completing the balance. Note there has been no mixture of store funds with the funds of the cash drawer up to this point, thus ensuring all revenue which is accountable to that cash drawer remains separate for re-evaluation, if necessary. The computer program then prompts the operator to remove all of the excess revenue from the top of the till. This revenue should be placed in a bank or other secured place.

At this point, the first cash drawer should be balanced, but the second cash drawer may still require additional revenue from store funds to meet the target amount for one or more denominations. For example, if the target amount for $1 bills in the second cash drawer is 35 and the first cash drawer only had 30 $1 bills in it, the second cash drawer needs five additional $1 bills to meet the target amount for this denomination. If this is the case, the computer program prompts the operator to add the required denominations as depicted in FIG. 8. In the illustrated example, the computer program prompts the operator to add three pennies, one nickel, one quarter, five $1 bills, three $5 bills, and four $10 bills. The operator should place these denominations of revenue into the second cash drawer in the order displayed. As the additional revenue is added, the computer program counts the revenue based on weight measurements received from the weigh scale 14 and removes each denomination from the list as the target amounts are reached. The computer program may also prompt for rolls of coins that may be needed to meet the target amounts for a particular type of cash drawer as depicted in FIG. 15.

At this point, the first cash drawer has been successfully balanced and the second cash drawer has been constructed so that it may be used by a cashier in a new shift. The operator is prompted to remove the completed till. When interfaced to the POS system 20, all balancing information is automatically transmitted back to the POS system 20. The computer program stores all information relating to the first cash drawer such as the amounts of all the different types or fields of revenue removed from the first cash drawer. The computer program also stores all information relating to the second cash drawer such as the amount of revenue and quantities of denominations of revenue added to the second cash drawer.

The computer program also permits an operator to print various reports or tickets relating to cash drawers and cashiers. For example, a Current Cashier List report illustrated in FIG. 9 that shows the sign-off times for all cashiers tracked by the computer program may be generated and printed. This report includes the date and time each cashier signed off, the cashier number for each cashier, and the total "called for" amounts for the cashiers.

A Cashier Balance report illustrated in FIG. 10 provides a complete balance record for a cashier after the cashier's cash drawer has been balanced. The report includes a complete inventory of the cash drawer contents, the total amount of revenue contained in the drawer, the starting amount in the cash drawer, the difference between the final amount of revenue and the starting amount of revenue, a comparison of the actual revenue amount versus the "called for" amounts for each revenue type or field, the final balance for the cash drawer, the total for all revenue types for the cash drawer, the weekly overs or shorts (O/S) indicating the cashier's balances for the week, a summary of the actual revenues in the cash drawer for each media type, and a total of all the actual amounts for the various revenue types.

A New Till Configuration report, as illustrated in FIG. 11, may be produced after a new cash drawer has been successfully constructed. This report shows the various denominations of revenue in the constructed cash drawer with unit counts and the total dollar amounts of each of the denominations. This report or ticket is preferably placed in the cash drawer before the cash drawer is used by a cashier, allowing the cashier or other person to verify the contents in less than one minute.

A Checks List report, as illustrated in FIG. 12, lists all of the checks that were accounted for in a cash drawer balancing routine. This report should be generated after each cash drawer that includes checks is balanced. The report includes a count of the number of checks encoded, a sequence number for each check, and the total amount of all of the checks.

A Credit/Debit Cards List report, as illustrated in FIG. 13, provides a printout of all credit/debit card transactions. This report is typically produced after balancing a cash drawer that contains credit/debit card receipts.

A Checks Batch List report, as illustrated in FIG. 14, provides a printout showing the amount of each check in the current batch and the total amount of all checks. This report is typically produced after the batch has been ended and typically accompanies the check deposit to the bank.

The computer program may also generate and print other reports including Current Cashier Balance, Help File, Check Batch Receipt, Credit Card Sub-Batch Ticket, Credit Card List, Missing Items, Credit Card Search, Pickup Cashier Balance, Loan Cashier Balance, Balance Correction, Safe Countdown, Cash In, Cash Out, Current Inventory, Daily Cashier Short/Long report, Media Totals, Weekly Cashier Short/Long, Daily Transaction log, FTP Error report, Accounts Set-Up, Denominations Set-Up, Systems Set-Up, and Closing Flags.

The computer program also has the ability to provide a "perpetual cash inventory" of all denominations of cash within a cash office of a store. The computer program and computer equipment 10 may be used to count the entire contents of a store safe, all cash drawers, and all starting till amounts to establish a base line inventory of all cash and related financial media in the store. As revenue is counted throughout the day, the inventory is updated. This permits cash deposits to be counted, by media, as part of bank deposits to decrease the inventory count of each denomination. Likewise, cash deliveries from a bank can be verified upon receipt to automatically update the inventory counts. By following these procedures, a store can maintain a running perpetual inventory of all revenue denominations. Then, by recounting the safe, cash drawers, and starting tills, the store can verify this inventory and post over/short balances.

By using this inventory data as well as a database of historical data, the computer program may also determine what an order for currency should be from a financial institution. This feature allows retailers to decrease working capital and increases their efficiency in ordering only an amount of currency which is necessary for operations until the next shipment of currency arrives.

The computer program and computer equipment 10 may also be used to create and maintain an inventory of coins from vending machines. Current accountability for those who stock vending machines is limited. This invention provides safeguards against dishonesty. As coins are brought to a store's cash office, the coins can be weighed and counted and kept in separate containers. The separate containers can then be used to replenish the coin requirements of new cash drawers rather than using rolled coins purchased from a bank. This can save a retailer from having to purchase larger amounts of rolled coins.

The computer program and computer equipment 10 may also track "loose" bills in a cash drawer and identify the number of additional loose bills needed to form a pack or clip of bills (typically 25 or 100 bills). As proceeds are removed from cash drawers, packs or clips can be built immediately. This eliminates the need to later recount loose bills in cash drawers to create clips or packs for transfer to a safe or for bank deposits.

The computer program and computer equipment 10 may also be used to verify vendor coupons, store coupons, or any other type of coupon. The weigh scale 14 may be used to verify all coupons for any cashier. Deviations outside of an acceptable range of the number of coupons versus programmable weight to value comparison will trigger an itemization list to appear whereby the operator must balance the coupons individually for the current till. This routine eliminates the need to balance all cashier coupons by pinpointing possible stuffing of coupons on a per till basis.

The computer program and computer equipment 10 may also be used for tracking credit card receipts. If the computer 12 is interfaced to the POS system 20, the computer program can store information about each credit card transaction, cashier number, an account number, the total amount of the transaction, the transaction number from the POS, the date, the time of day, and a unique five-digit number assigned by the computer program for identifying a stack of credit card receipts from a cash drawer being balanced. The above information can be retrieved at a future date if needed to locate an original credit card transaction slip if it is needed to prove a customer's signature of the transaction slip.

To perform such a credit card transaction slip search, an operator may type in certain of the above items of information into the computer 12. A software routine then searches all files and responds with the unique five-digit number which corresponds to the entered information. With the five-digit number, an operator may quickly locate all transaction slips from a particular cash register and then find the desired transaction slip. This feature makes recovery time of contested credit card transactions approximately two minutes instead of an average time of two hours, if found at all.

If a copy of the original customer signed credit card slip cannot be produced on contested charges within a few days of the notice from the credit card company, the retailer's account is automatically debited the entire amount of the sale. The volume of credit card transactions continues to increase weekly. As more consumers become aware of retailers' inability to timely produce the original signed copy of the transaction, it can be expected that the volume of contested charges will increase dramatically. A dishonest consumer who manages to take advantage of a careless cashier and leave a store with a signed copy of the credit card slip knows this retailer cannot produce their signature when contested, making their entire purchase free. This scam could grow to unbelievable proportions if dishonest cashiers become an active part of the process. The term "sweethearting" in retail is when a cashier either charges a friend or relative less than an item's price or does not charge anything for an item or items. The above described scam is the ultimate in sweethearting. To compound the problem, credit card transactions are processed and electronically transmitted to the credit card companies at the time of the purchase, creating a lapse time of a few days or weeks before the retailer is notified to produce the customer's signature.

In an attempt to control this problem, the program also tracks, by cashier, all missing signed credit card slips, printing them on the unique 5-digit numbered slip created by the system's printer 18 and storing the information on the hard drive of the computer 12. This and all information stored is retrievable for a period of six months, or longer if the customer desires. If the setting is six months, the system automatically drops the first day of the six month period and adds today's information to the files. Managers can be notified of these situations as they take place, not weeks later.

The computer program and computer equipment 10 may also be used to create log files of operator and cashier activity and use these log files to provide meaningful reports to managers. The reports may be used to identify places where more training is needed in order to ensure corporate-wide consistency in daily operations. The reports may be directly transmitted to corporate managers and may be as specific as identifying every key stroke pressed by an operator or cashier or the report may be as general as providing summarizing data.

The present invention provides numerous benefits and advantages. For example, because the computer program of the present invention automates the reconciliation and balancing of cash drawers, and provides prompts to operators during these procedures, operators never get lost or need to start over when returning to complete a till balance after they have been interrupted. This essentially eliminates lost labor due to interruptions and dramatically reduces the time required to balance a cash drawer.

Another advantage is that the invention eliminates the mixing of cashier funds with store funds until a satisfactory balance of a cash drawer has been accomplished. This significantly reduces errors associated with such revenue mixing.

The invention also provides a consistent routine for all personnel that use the system, whether the personnel are in a particular store or at various stores owned by the same company. This simplifies training and dramatically increases productivity. Notwithstanding this consistency, daily and weekly closing procedures can be customizable for each store and performed automatically by utilizing options on the main menu screen.

Another advantage is that for the first time in the history of balancing cash drawers/tills, the invention allows a retailer a cost-effective way to balance cashiers' revenues each time they go on a break or a lunch break as well as at the end of their shift. What makes this process possible is the computer program's systematic step-by-step method of processing and accounting for all the multiple types of revenue which can be present in a cashier's cash drawer. This extremely fast and accurate method of balancing cash drawers, and at the same time building or constructing new cash drawers for cashiers who need a "fresh till" when starting a shift or returning from a break, provides each cashier the correct quantities of each denomination to process customers' purchases for the next 2 to 3 hours without interruptions. This process effectively eliminates the need for pick-ups, loans, and/or purchasing additional change because the cashier's "fresh till" provides adequate change making ability until their next break.

The benefits of such rapid and accurate balancing and reconciliation routines are many. One important benefit is that a store may provide all of its cashiers "fresh tills" every 2 to 3 hours. Historically, retailers by necessity must repeatedly perform pick-ups (the removal of excess cash for security reasons), loans (additional cash quantities needed to continue to make change), and/or cashier's purchase of additional change. The present invention can effectively eliminate these three requirements. Pick-ups, loans, and purchasing change steps each require the involvement of two to three employees: a cashier, a front-end supervisor, and in most operations, a cash office person or a customer service person. Providing each cashier a "fresh till" every two to three hours can eliminate all three of the employees' labor currently being invested in pick-ups, loans, and change purchases. The invention also more quickly processes required pick-ups and loans. Customer service is also greatly improved as customers no longer must wait in line for a supervisor to bring a cashier needed change to continue checking out purchases.

Another benefit of balancing cash drawers every two to three hours is the attainment of cash control each time a cash drawer is balanced. This provides management the ability to discuss shortages or policy and procedure requirements with each cashier normally when they return from their break.

Although the invention has been described with reference to the preferred embodiment illustrated in the attached drawing figures, it is noted that equivalents may be employed and substitutions made herein without departing from the scope of the invention as recited in the claims. For example, although the computer program of the present invention is preferably used with a computer 12 coupled to a POS system 20, "called for" amounts and target amounts may be directly entered into the computer 12. Similarly, although the preferred computer program counts revenue based on the weight of revenue, the revenue can also be manually counted and then manually entered into the computer 12 via a keyboard or other input device 22.

Having thus described the preferred embodiment of the invention, what is claimed as new and desired to be protected by letters patent includes the following:

What is claimed is:

1. A method of balancing non-cash revenue items in a cash drawer of a cash register, the method comprising the steps of:
    (a) tracking receipt of the non-cash revenue items, including an expected monetary amount associated with each of the items, with a point-of-sale system coupled with the cash register;
    (b) when balancing the cash drawer, substantially automatically displaying the expected monetary amount of at least a first one of the items that was received in the cash drawer based on information provided by the point-of-sale system;
    (c) prompting an operator to review the items and to indicate whether an actual monetary amount of the first item received in the cash drawer equals the displayed expected monetary amount; and
    (d) if the operator indicates that the actual monetary amount equals the expected monetary amount, repeating steps (b) and (c) for each additional item until all of the items received in the cash drawer have been verified.

2. The method as set forth in claim 1, wherein the non-cash revenue items are checks.

3. The method as set forth in claim 2, further including the step of, if the operator indicates that the actual monetary amount equals the expected monetary amount, encoding the first check with a code indicating the actual monetary amount of the first check.

4. The method as set forth in claim 1, wherein the non-cash revenue items are credit card receipts.

5. The method as set forth in claim 4, further including the steps of—
   when balancing the cash drawer, weighing all of the credit card receipts received in the cash drawer;
   dividing the weight of all of the credit card receipts by the weight of a single credit card receipt to determine an actual number of credit card receipts received in the cash drawer; and
   if the actual number of credit card receipts equals an expected number of credit card receipts, skipping steps (b), (c), and (d), wherein the expected number of credit card receipts is based on information provided by the point-of-sale system.

6. A method of balancing checks received in a cash drawer of a cash register, the method comprising the steps of:
   (a) tracking receipt of the checks, including an expected monetary amount associated with each of the checks, with a point-of-sale system coupled with the cash register;
   (b) when it is desired to balance the cash drawer, substantially automatically displaying the expected monetary amount of at least a first one of the checks that was received in the cash drawer based on information provided by the point-of-sale system;
   (c) prompting an operator to review the checks from the cash drawer and to indicate whether an actual monetary amount of the first check received in the cash drawer equals the displayed expected monetary amount;
   (d) if the operator indicates that the actual monetary amount equals the expected monetary amount, encoding the first check with a code indicating the actual monetary amount of the first check; and
   (e) repeating steps (b), (c), and (d) for each additional check until all of the checks received in the cash drawer have been encoded.

7. A method of balancing credit card receipts received in a cash drawer of a cash register, the method comprising the steps of:
   (a) tracking receipt of the credit card receipts, including an expected monetary amount associated with each of the credit card receipts, with a point-of-sale system coupled with the cash register;
   (b) when balancing the cash drawer, weighing all of the credit card receipts received in the cash drawer;
   (c) dividing the weight of all of the credit card receipts by the weight of a single credit card receipt to determine an actual number of credit card receipts received in the cash drawer;
   (d) if the actual number of credit card receipts equals an expected number of credit card receipts, considering the credit card receipts balanced, wherein the expected number of credit card receipts is based on information provided by the point-of-sale system; and
   (e) if the actual number of credit card receipts does not equal the expected number of credit card receipts—
      ($e_1$) substantially automatically displaying the expected monetary amount of at least a first one of the credit card receipts that was received in the cash drawer based on information provided by the point-of-sale system,
      ($e_2$) prompting an operator to review the items and to indicate whether an actual monetary amount of the first credit card receipt received in the cash drawer equals the displayed expected monetary amount, and
      ($e_3$) if the operator indicates that the actual monetary amount equals the expected monetary amount, repeating steps ($e_1$) and ($e_2$) for each additional credit card receipt.

8. A method of balancing non-cash revenue items received in a cash drawer of a cash register, the method comprising the steps of:
   (a) tracking receipt of the non-cash revenue items, including an expected monetary amount associated with each of the items, with a point-of-sale system coupled with the cash register;
   (b) allowing for selecting between a manual alternative and an automatic alternative for balancing the cash drawer;
   (c) if the manual alternative is selected, requiring an operator to manually input an actual monetary amount from a first one of the items; and
   (d) if the automatic alternative is selected, substantially automatically displaying the expected monetary amount of at least a first one of the items and allowing the operator to verify the expected monetary amount without manually inputting the actual monetary amount.

9. The method as set forth in claim 8, wherein the non-cash revenue items are checks.

10. The method as set forth in claim 9, further including the steps of, if the actual monetary amount equals the expected monetary amount, encoding the first check with a code indicating the actual monetary amount of the first check.

11. The method as set forth in claim 8, wherein the non-cash revenue items are credit card receipts.

12. The method as set forth in claim 11, further including the steps of—
   when balancing the cash drawer, weighing all of the credit card receipts received in the cash drawer;
   dividing the weight of all of the credit card receipts by the weight of a single credit card receipt to determine an actual number of credit card receipts received in the cash drawer; and
   if the actual number of credit card receipts equals an expected number of credit card receipts, skipping steps (c) and (d), wherein the expected number of credit card receipts is based on information provided by the point-of-sale system.

13. The method as set forth in claim 8, further including the step of, if the manual alternative is selected, substantially automatically displaying the expected monetary amount of at least the first one of the items but still requiring the operator to manually input the actual monetary amount from the first one of the items.

14. The method as set forth in claim 8, wherein step (c) further includes—
   substantially automatically comparing the inputted actual monetary amount with the expected monetary amount, wherein the expected monetary amount is based on information received from the point-of-sale terminal; and
   if the actual monetary amount is equal to the expected monetary amount, repeating step (c) for each additional item until all of the items received in the cash drawer have been verified.

15. The method as set forth in claim 8, wherein step (d) further includes— prompting the operator to review the items and to indicate whether the actual monetary amount of one of the items equals the displayed expected monetary amount; and if the operator indicates that the actual monetary amount equals the expected monetary amount, repeating step (d) for each additional item until all of the items received in the cash drawer have been verified.

16. A method of balancing non-cash revenue items received in a cash drawer of a cash register, the method comprising the steps of:
   (a) tracking receipt of the non-cash revenue items, including an expected monetary amount associated with each of the items, with a point-of-sale system coupled with the cash register;
   (b) allowing for selecting between a manual alternative and an automatic alternative for balancing the cash drawer;
   (c) if the manual alternative is selected—
      ($c_1$) requiring an operator to manually input an actual monetary amount from a first one of the items,
      ($c_2$) substantially automatically comparing the inputted actual monetary amount with the expected monetary amount, wherein the expected monetary amount is based on information received from the point-of-sale terminal, and
      ($c_3$) if the actual monetary amount is equal to the expected monetary amount, repeating steps ($c_1$) and ($c_2$) for each additional item until all of the items received in the cash drawer have been verified; and
   (d) if the automatic alternative is selected—
      ($d_1$) substantially automatically displaying the expected monetary amount of at least a first one of the items,
      ($d_2$) prompting the operator to review the items and to indicate whether the actual monetary amount of one of the items equals the displayed expected monetary amount, and
      ($d_3$) if the operator indicates that the actual monetary amount equals the expected monetary amount, repeating steps ($d_1$) and ($d_2$) for each additional item until all of the items received in the cash drawer have been verified.

17. The method as set forth in claim 16, wherein the non-cash revenue items are checks.

18. The method as set forth in claim 17, further including the steps of, if the actual monetary amount equals the expected monetary amount, encoding the first check with a code indicating the actual monetary amount of the first check.

19. The method as set forth in claim 16, wherein the non-cash revenue items are credit card receipts.

20. The method as set forth in claim 19, further including the steps of—
   when balancing the cash drawer, weighing all of the credit card receipts received in the cash drawer;
   dividing the weight of all of the credit card receipts by the weight of a single credit card receipt to determine an actual number of credit card receipts received in the cash drawer; and
   if the actual number of credit card receipts equals an expected number of credit card receipts, skipping steps (c) and (d), wherein the expected number of credit card receipts is based on information provided by the point-of-sale system.

21. The method as set forth in claim 16, further including the step of, if the manual alternative is selected, substantially automatically displaying the expected monetary amount of at least the first one of the items but still requiring the operator to manually input the actual monetary amount from the first one of the items.

* * * * *